(12) United States Patent
Chen et al.

(10) Patent No.: US 12,483,036 B2
(45) Date of Patent: Nov. 25, 2025

(54) PHOTOVOLTAIC POWER SUPPLY SYSTEM AND CONTROL METHOD THEREOF, AND AIR CONDITIONING UNIT

(71) Applicant: Gree Electric Appliances, Inc. of Zhuhai, Guangdong (CN)

(72) Inventors: Ningning Chen, Guangdong (CN); Xianqiao Yu, Guangdong (CN); Jing Wang, Guangdong (CN); Meng Huang, Guangdong (CN); Peiyu Dang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 503 days.

(21) Appl. No.: 18/016,257

(22) PCT Filed: Jul. 12, 2021

(86) PCT No.: PCT/CN2021/105667
§ 371 (c)(1),
(2) Date: Jan. 13, 2023

(87) PCT Pub. No.: WO2022/077973
PCT Pub. Date: Apr. 21, 2022

(65) Prior Publication Data
US 2023/0283080 A1   Sep. 7, 2023

(30) Foreign Application Priority Data

Oct. 15, 2020 (CN) .......................... 202011105878.3
Jan. 12, 2021 (CN) .......................... 202110038982.3

(51) Int. Cl.
*F24F 11/88* (2018.01)
*H02J 3/38* (2006.01)

(52) U.S. Cl.
CPC .............. *H02J 3/381* (2013.01); *F24F 11/88* (2018.01); *H02J 2300/24* (2020.01)

(58) Field of Classification Search
CPC .......... H02J 3/381; H02J 2300/24; H02J 1/10; H02J 3/28; F24F 11/88; F24F 2005/0067; F24F 5/0046; Y02E 10/56; Y02E 70/30
See application file for complete search history.

(56) References Cited

U.S. PATENT DOCUMENTS

2010/0295381 A1* 11/2010 Burger ...................... H02J 7/35
307/126
2017/0133857 A1* 5/2017 Sun ......................... H02M 7/48
(Continued)

FOREIGN PATENT DOCUMENTS

AU    2010202078 A1    12/2010
CN    202364144 U  *   8/2012
(Continued)

OTHER PUBLICATIONS

Extended European Search Report, EP 21879021, Feb. 13, 2024.
CN 202110038982.3, First Examination Report Notification, Dec. 12, 2024.

*Primary Examiner* — Charles Cai
(74) *Attorney, Agent, or Firm* — The Webb Law Firm

(57) ABSTRACT

Disclosed are a photovoltaic power supply system and a control method thereof, and an air conditioning unit. The system includes: a photovoltaic cell panel; a direct-current bus; a DC/DC converter, one end of which is connected to the photovoltaic cell panel, and the other end of which is connected to the direct-current bus; and a switch assembly arranged in parallel with the DC/DC converter, wherein one end of the switch assembly is connected to the photovoltaic cell panel, and the other end thereof is connected to the direct-current bus, and the switch assembly is used for controlling a grid connection mode of the photovoltaic cell (Continued)

panel. When the switch assembly is turned off, the photovoltaic cell panel is connected to the direct-current bus by means of the DC/DC converter; and when the switch assembly is turned on, the photovoltaic cell panel is directly connected to the direct-current bus.

8 Claims, 3 Drawing Sheets

(56) References Cited

U.S. PATENT DOCUMENTS

| | | |
|---|---|---|
| 2017/0358926 A1 | 12/2017 | Zhou et al. |
| 2018/0048160 A1 | 2/2018 | Narla |
| 2018/0083453 A1* | 3/2018 | Chang ..................... H02M 7/48 |

FOREIGN PATENT DOCUMENTS

| | | | | |
|---|---|---|---|---|
| CN | 104065336 A | | 9/2014 | |
| CN | 104158208 A | | 11/2014 | |
| CN | 104319761 A | | 1/2015 | |
| CN | 204103796 A | | 1/2015 | |
| CN | 104467507 A | | 3/2015 | |
| CN | 205407620 U | | 7/2016 | |
| CN | 206472100 U | | 9/2017 | |
| CN | 108281952 A | * | 7/2018 | ................ H02J 7/35 |
| CN | 108767842 A | | 11/2018 | |
| CN | 110336310 A | | 10/2019 | |
| CN | 111711227 A | | 9/2020 | |
| CN | 112234649 A | | 1/2021 | |
| CN | 112600250 A | | 4/2021 | |
| CN | 214255736 U | | 9/2021 | |

* cited by examiner

PHOTOVOLTAIC POWER SUPPLY SYSTEM AND CONTROL METHOD THEREOF, AND AIR CONDITIONING UNIT

CROSS-REFERENCE TO RELATED APPLICATIONS

The present application is a United States National Stage of International Application No. PCT/CN2021/105667 filed Jul. 12, 2021, and claims priority to Chinese Patent Application No. 202011105878.3 filed Oct. 15, 2020, and Chinese Patent Application No. 202110038982.3 filed Jan. 12, 2021, the disclosures of which are hereby incorporated by reference in their entireties.

BACKGROUND OF THE INVENTION

Field of the Invention

The present invention relates to a photovoltaic power supply system and a control method thereof, and an air conditioning unit.

Description of Related Art

In the photovoltaic (energy storage) air conditioning system known by the inventors, the voltage of a photovoltaic cell is output to a high-voltage DC bus through a DC/DC converter. The DC/DC converter realizes a boosting function to boost the voltage output by the photovoltaic cell to a set DC bus voltage.

SUMMARY OF THE INVENTION

According to one aspect of the embodiments of the present disclosure, a photovoltaic power supply system is provided. The system comprises: a photovoltaic panel; a DC bus; a DC/DC converter, wherein one end of the DC/DC converter is connected to the photovoltaic panel and the other end of the DC/DC converter is connected to the DC bus; and a switch assembly arranged in parallel with the DC/DC converter and configured to control a grid connection mode of the photovoltaic panel, wherein one end of the switch assembly is connected to the photovoltaic panel and the other end of the switch assembly is connected to the DC bus, wherein the photovoltaic panel is connected to the DC bus through the DC/DC converter when the switch assembly is turned off, and the photovoltaic panel is directly connected to the DC bus when the switch assembly is turned on.

According to another aspect of the embodiments of the present disclosure, a control method of a photovoltaic power supply system is provided. The control method comprises: detecting an operation state of an energy storage system and an output voltage of a photovoltaic panel; determining a grid connection mode of the photovoltaic panel according to the operation state of the energy storage system and the output voltage of the photovoltaic panel; and controlling operations of a switch assembly and a DC/DC converter according to the grid connection mode.

According to a further aspect of the embodiments of the present disclosure, an air conditioning unit is provided. The air conditioning unit comprises the photovoltaic power supply system described above, wherein a compressor of the air conditioning unit is powered by the DC bus.

According to still another aspect of the embodiments of the present disclosure, a storage medium having computer-executable instructions is provided. The control method of a photovoltaic power supply system described above is performed when the instructions are executed by a computer processor.

Figure 1:
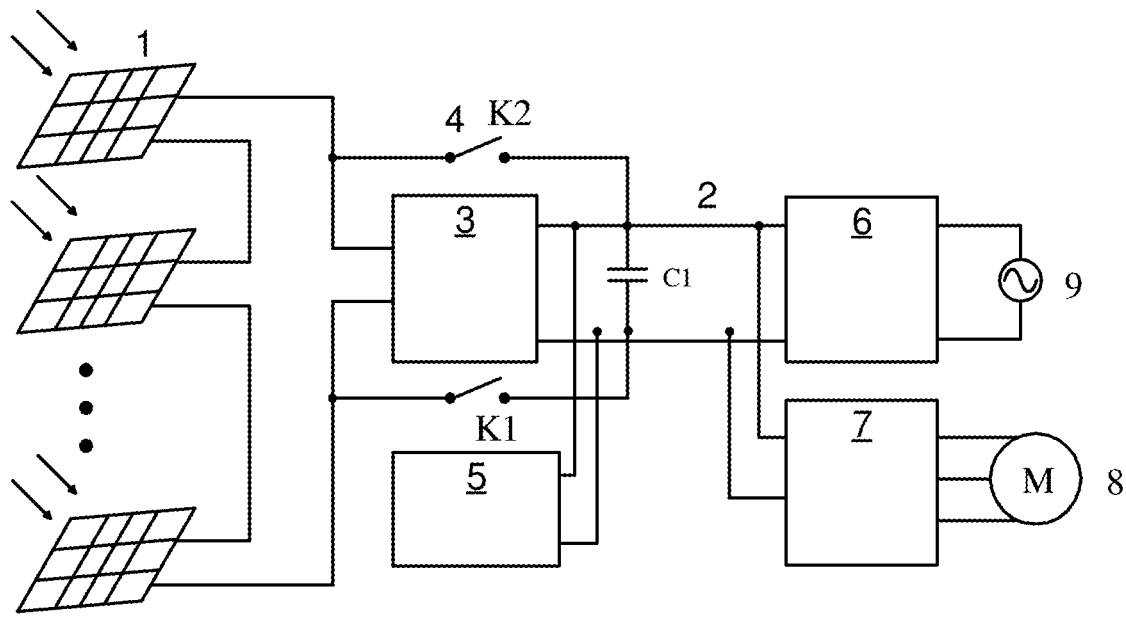
FIG. 1 is a schematic structural view showing a photovoltaic power supply system according to some embodiments of the present disclosure.

DESCRIPTION OF REFERENCE NUMERALS 1. photovoltaic panel; 2. direct-current (DC) bus; 3. DC/DC converter; 4. switch assembly; 5. energy storage system; 6. DC/AC converter; 7. compressor driver; 8. electric motor; 9. alternating-current (AC) power grid.

DESCRIPTION OF THE INVENTION

Exemplary embodiments will be described in detail here, examples of embodiments are illustrated in the accompanying drawings. When the following description relates to the accompanying drawings, unless otherwise indicated, the same numeral in different accompanying drawings represents the same or similar element. The implementations described in the following exemplary embodiments do not represent all the implementations consistent with the present disclosure. By contrary, they are merely examples of devices and methods consistent with some aspects of the present disclosure, as detailed in the appended claims.

In the photovoltaic air conditioning system known by the inventors, when the photovoltaic panel generates power, the DC/DC converter is always in operation, which leads to power loss and brings pressure to the heat dissipation of the photovoltaic air conditioning system.

In some embodiments of the present disclosure, a photovoltaic power supply system is provided. FIG. 1 is a schematic structural view showing a photovoltaic power supply system according to some embodiments of the present disclosure. As shown in FIG. 1, the system comprises a photovoltaic panel 1, a DC bus 2, a DC/DC converter 3 and a switch assembly 4.

One end of the DC/DC converter 3 is connected to the photovoltaic panel 1 and the other end of the DC/DC converter 3 is connected to the DC bus 2.

The switch assembly 4 is arranged in parallel with the DC/DC converter 3 and configured to control a grid connection mode of the photovoltaic panel 1. One end of the switch assembly 4 is connected to the photovoltaic panel 1 and the other end of the switch assembly 4 is connected to the DC bus 2. When the switch assembly 4 is turned off, the photovoltaic panel 1 is connected to the DC bus 2 through the DC/DC converter 3. When the switch assembly 4 is turned on, the photovoltaic panel 1 is directly connected to the DC bus 2.

In the above embodiments, a photovoltaic power supply system realizing a self-adaptive operation mode is provided. The switch assembly arranged in parallel with a DC/DC converter is configured to control a grid connection mode of a photovoltaic panel. When the switch assembly is turned off, the photovoltaic panel is connected to the DC bus through the DC/DC converter; and when the switch assembly is turned on, the photovoltaic panel is directly connected to the DC bus. By way of the above manner, the problem of power loss due to the DC/DC converter continuous in boosting operation when the photovoltaic panel generates power. At the same time, the photovoltaic panel can be directly connected to the DC bus, which increases the photovoltaic power consumption efficiency so that the heat dissipation pressure of the system during the operation of photovoltaic power generation is alleviated and the heat dissipation effect of the system is improved.

The inventors have noticed that, when there is a plurality of photovoltaic panels, the power supply voltage of a photovoltaic panel is greater than the DC bus voltage in some cases. To maintain the voltage of the DC bus stable, the open circuit voltage of the connected photovoltaic panel is required to be not greater than the voltage of the DC bus, thus there is a limited number of connected photovoltaic panels.

In some embodiments of the present disclosure, the output voltage of the photovoltaic panel 1 is output to the DC bus 2 after being boosted or bucked by the DC/DC converter 3. When the open circuit voltage of a photovoltaic panel is greater than the voltage of the DC bus, the DC/DC converter 3 is in a bucking operation (the DC/DC converter 3 is generally in a boosting operation in the photovoltaic air conditioning system known by the inventors), thereby solving the problem of a limited number of connected photovoltaic panels and increasing the number of photovoltaic panels that can be connected. Even if the open circuit voltage of a photovoltaic panel is greater than the voltage of the DC bus, the voltage of the DC bus can be still maintained to be stable.

In some embodiments, the switch assembly 4 comprises a first switch K1 and a second switch K2. In some embodiments, the photovoltaic power supply system further comprises a capacitor C1 for maintaining the voltage of the DC bus stable.

In some embodiments, the photovoltaic power supply system further comprises an energy storage system 5 located between the DC/DC converter 3 and the DC bus 2, arranged in parallel with the DC bus 2, and configured to supply power to the DC bus 2 or store power from the DC bus 2. In some embodiments of the present disclosure, when the energy storage system in operation is connected to the photovoltaic power supply system and the voltage of the DC bus 2 is stable, the DC/DC converter 3 is in operation and realize the boosting operation or bucking operation according to the output voltage of the photovoltaic panel 1. When the energy storage system is not in operation, and the output voltage of the photovoltaic panel 1 is greater than a set value, the DC/DC converter 3 is not in operation and the photovoltaic power is directly connected to the bus, so that the voltage of the DC bus changes as the output voltage of the photovoltaic panel 1, thereby increasing the photovoltaic power consumption efficiency and improving the heat dissipation effect of the system. When the energy storage system is not in operation and the output voltage of the photovoltaic panel 1 is smaller than a set value, the DC/DC converter 3 is in boosting operation to maintain the voltage of the DC bus 2 and realize a normal operation of inversion. In this system, the DC/DC converter 3 can freely switch an operation state according to the mode and related parameters of the system, realizing boosting operation, bucking operation or not in operation. At the same time, the number configuration of the photovoltaic panel is more flexible, and the market application is more general.

As shown in FIG. 1, in some embodiments, the photovoltaic power supply system further comprises a DC/AC converter 6. One end of the DC/AC converter 6 is connected to the DC bus 2 and the other end of the DC/AC converter 6 is connected to an AC power grid 9. The DC/AC converter 6 is configured to supply power to the AC power grid 9 after converting DC power of the DC bus 2 into AC power.

In some embodiments, the photovoltaic power supply system is directly connected to the compressor driver 7 to drive the electric motor 8 of the compressor to operate and supply power to an air conditioner.

Figure 2:
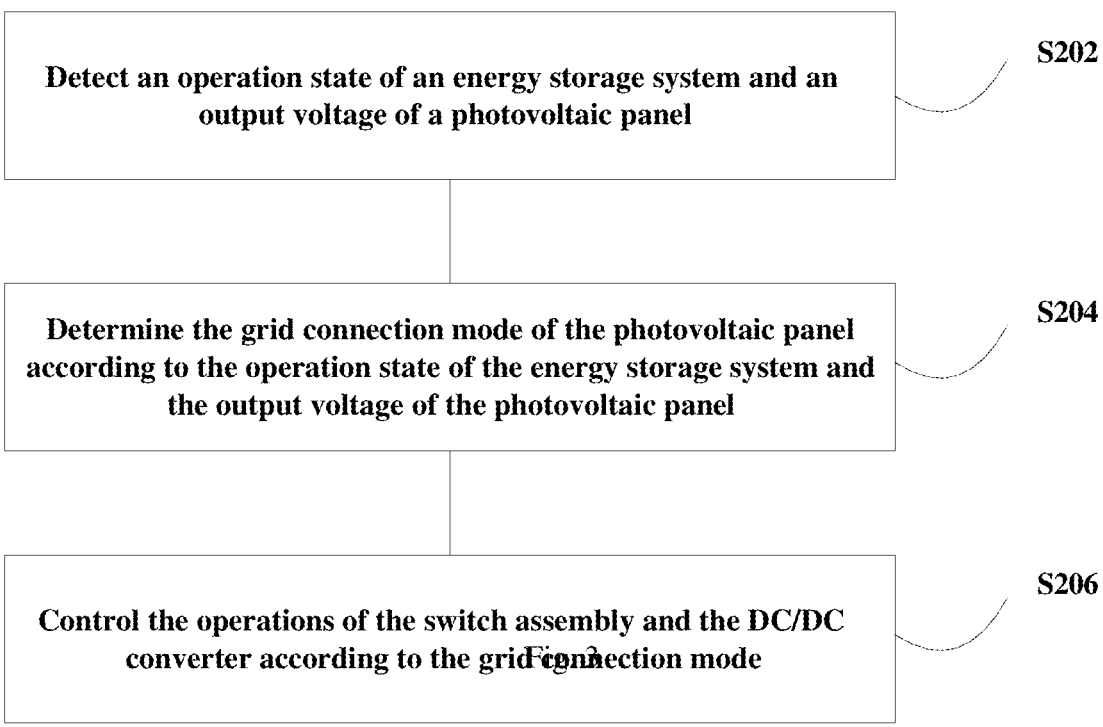
FIG. 2 is a flowchart of a control method of a photovoltaic power supply system according to some embodiments of the present disclosure.

In some embodiments of the present disclosure, a control method of the photovoltaic power supply system is provided, which is applied to the photovoltaic power supply system in the above embodiments. Specifically, FIG. 2 is a flowchart of a control method of a photovoltaic power supply system according to some embodiments of the present disclosure. As shown in FIG. 2, the control method comprises the following steps S202-S206.

In S202: the operation state of the energy storage system and the output voltage of the photovoltaic panel are detected.

In S204: the grid connection mode of the photovoltaic panel is determined according to the operation state of the energy storage system and the output voltage of the photovoltaic panel.

In S206: the operations of the switch assembly and the DC/DC converter are controlled according to the grid connection mode.

In the above embodiments, a photovoltaic power supply system realizing a self-adaptive operation mode is provided. The switch assembly arranged in parallel with a DC/DC converter is configured to control a grid connection mode of a photovoltaic panel. When the switch assembly is turned off, the photovoltaic panel is connected to the DC bus through the DC/DC converter; and when the switch assembly is turned on, the photovoltaic panel is directly connected to the DC bus. By way of the above manner, the problem of power loss due to the DC/DC converter continuous in boosting operation when the photovoltaic panel generates power. At the same time, the photovoltaic panel can be directly connected to the DC bus, which increases the photovoltaic power consumption efficiency so that the heat dissipation pressure of the system during the operation of photovoltaic power generation is alleviated and the heat dissipation effect of the system is improved.

As shown in FIG. 1, the system comprises a DC/DC converter, a DC/AC converter, an energy storage system 5, a compressor driver 7, an electric motor 8, and a switch assembly K1/K2. The photovoltaic panel 1 is an external system component in the project. Photovoltaic power can be output to the DC bus 2 through the DC/DC converter 3. Or photovoltaic power can be directly output to the DC bus 2 through the controllable switch K1/K2 with the DC/DC converter 3 omitted, thus the photovoltaic power generation utilization rate is higher without considering the heat dissipation of the power tube in the DC/DC converter 3. The DC/DC converter 3 is in boosting operation or bucking operation.

The specific operation process is as follows.

The energy storage system 5 has different operation states. According to the operation states of the energy storage system 5, the grid connection modes of the photovoltaic air conditioner are also different. Specifically, the step of determining the grid connection mode of the photovoltaic panel 1 according to the operation state of the energy storage system 5 and the output voltage of the photovoltaic panel 1 comprises: judging whether the output voltage of the photovoltaic panel 1 is greater than a first preset voltage value when the energy storage system 5 is in operation, the first preset voltage value is the voltage value of the DC bus 2; if the output voltage of the photovoltaic panel 1 is greater than the first preset voltage value, it is determined that the grid connection mode of the photovoltaic panel 1 is bucking grid connection; and if the output voltage of the photovoltaic panel 1 is not greater than the first preset voltage value, it is determined that the grid connection mode of the photovoltaic panel 1 is boosting grid connection.

Figure 3:
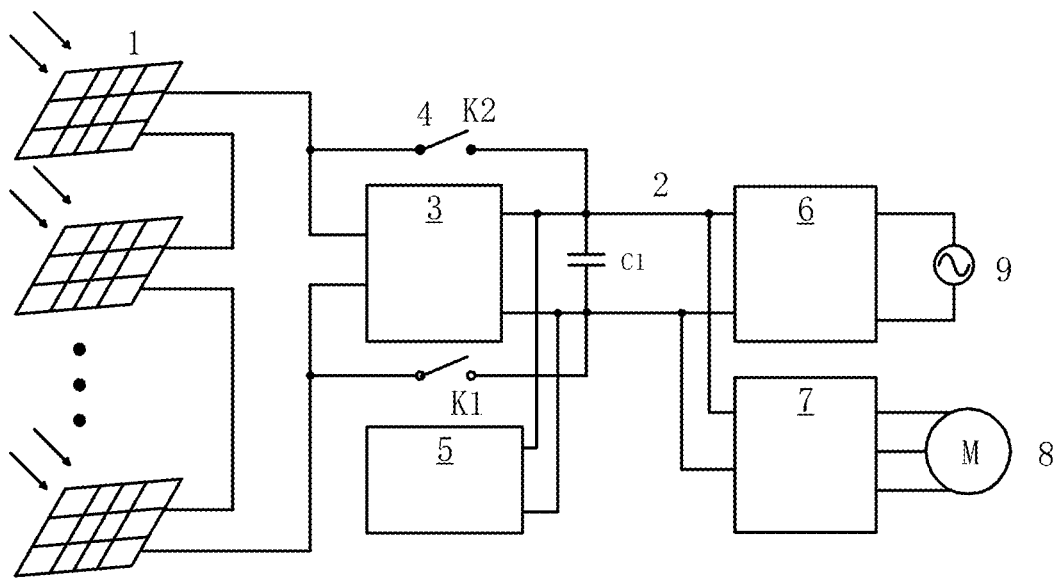
FIG. 3 is a schematic view showing the operation of the photovoltaic power supply system when the energy storage system is in operation according to some embodiments of the present disclosure.

The step of controlling the operations of the switch assembly 4 and the DC/DC converter 3 according to the grid connection mode comprises: controlling the switch assembly 4 to turn off and controlling the DC/DC converter 3 to be in bucking operation, when the grid connection mode of the photovoltaic panel 1 is bucking grid connection; and controlling the control switch assembly 4 to turn off and controlling the DC/DC converter 3 to be in boosting operation, when the grid connection mode of the photovoltaic panel 1 is boosting grid connection. FIG. 3 is a schematic view showing the operation of the photovoltaic power supply system when the energy storage system is in operation. As shown in FIG. 3, the energy storage system 5 is in operation, the switch assembly 4 is turned off, and the DC/DC converter 3 is in boosting operation or bucking operation. Photovoltaic power is grid connected or supplied to the compressor for use.

In addition, the energy storage system 5 also has a state of not in operation. When the energy storage system 5 is not in operation, the step of determining the grid connection mode of the photovoltaic panel 1 according to the operation state of the energy storage system 5 and the output voltage of the photovoltaic panel 1 comprises: judging whether the output voltage of the photovoltaic panel 1 is greater than a second preset voltage value, the second preset voltage value is a minimum voltage value that drives the DC/AC converter 6 to operate; if the output voltage of the photovoltaic panel 1 is greater than the second preset voltage value, it is determined that the grid connection mode of the photovoltaic panel 1 is direct grid connection; if the output voltage of the photovoltaic panel 1 is not greater than the second preset voltage value, it is determined that the grid connection mode of the photovoltaic panel 1 is boosting grid connection.

Figure 4:
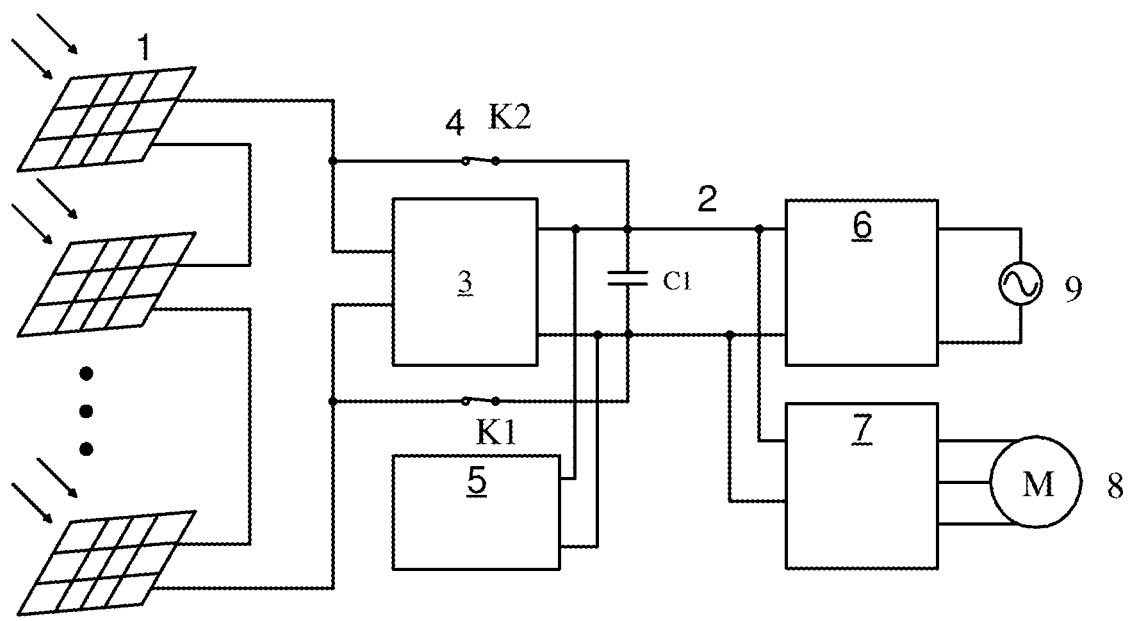
FIG. 4 is a schematic view showing the operation of the photovoltaic power supply system when the energy storage system and the DC/DC converter are not in operation according to some embodiments of the present disclosure.

The step of controlling the operations of the switch assembly 4 and the DC/DC converter 3 according to the grid connection mode comprises: controlling the switch assembly 4 to turn on such that the photovoltaic panel 1 is directly connected to the DC bus 2, when the grid connection mode of the photovoltaic panel 1 is direct grid connection. FIG. 4 is a schematic view showing the operation of the photovoltaic power supply system when the energy storage system and the DC/DC converter are not in operation. As shown in FIG. 4, the DC/DC converter 3 is not in operation, the switch K1/K2 is turned on, and photovoltaic power is directly output to the DC bus 2 through the controllable switch K1/K2, which increases the photovoltaic power generation utilization rate and alleviates the heat dissipation pressure of the system at the same time.

Figure 5:
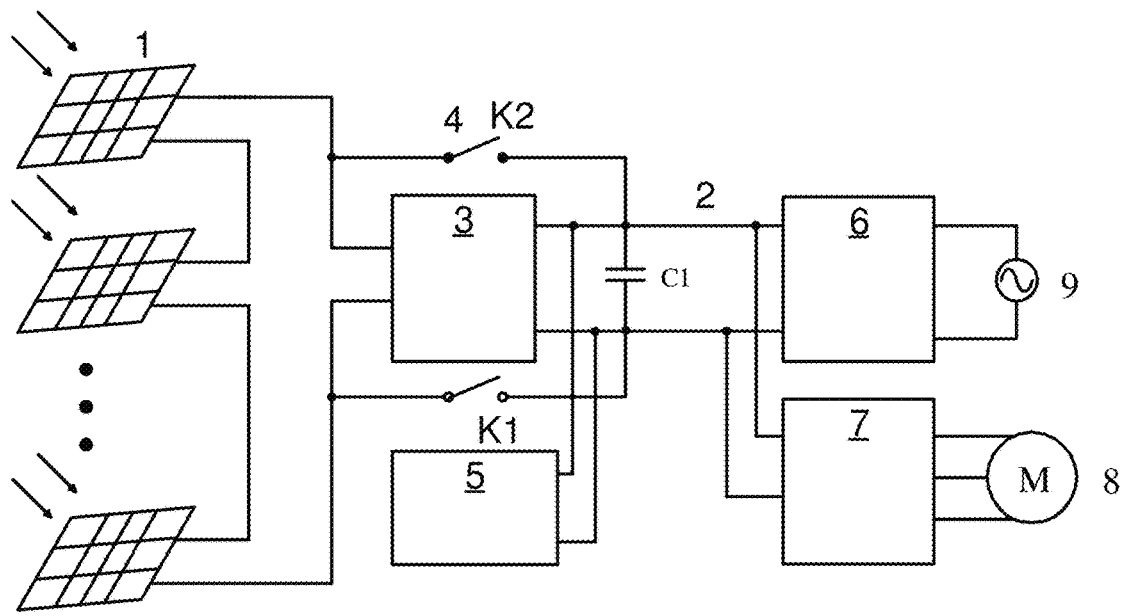
FIG. 5 is a schematic view showing the operation of the photovoltaic power supply system when the energy storage system is not in operation and the DC/DC converter is in operation according to some embodiments of the present disclosure.

When the grid connection mode of the photovoltaic panel 1 is boosting grid connection, the switch assembly 4 is controlled to turn off, and the DC/DC converter 3 is controlled to be in boosting operation. FIG. 5 is a schematic view showing the operation of the photovoltaic power supply system when the energy storage system is not in operation and the DC/DC converter is in operation. As shown in FIG. 5, the controllable switch K1/K2 is turned on, and the DC/DC converter 3 is in boosting operation, which maintain normal operation of inverting grid connection in the system. In this case, photovoltaic power generation is also grid connected or supplied to the compressor for use.

Figure 6:
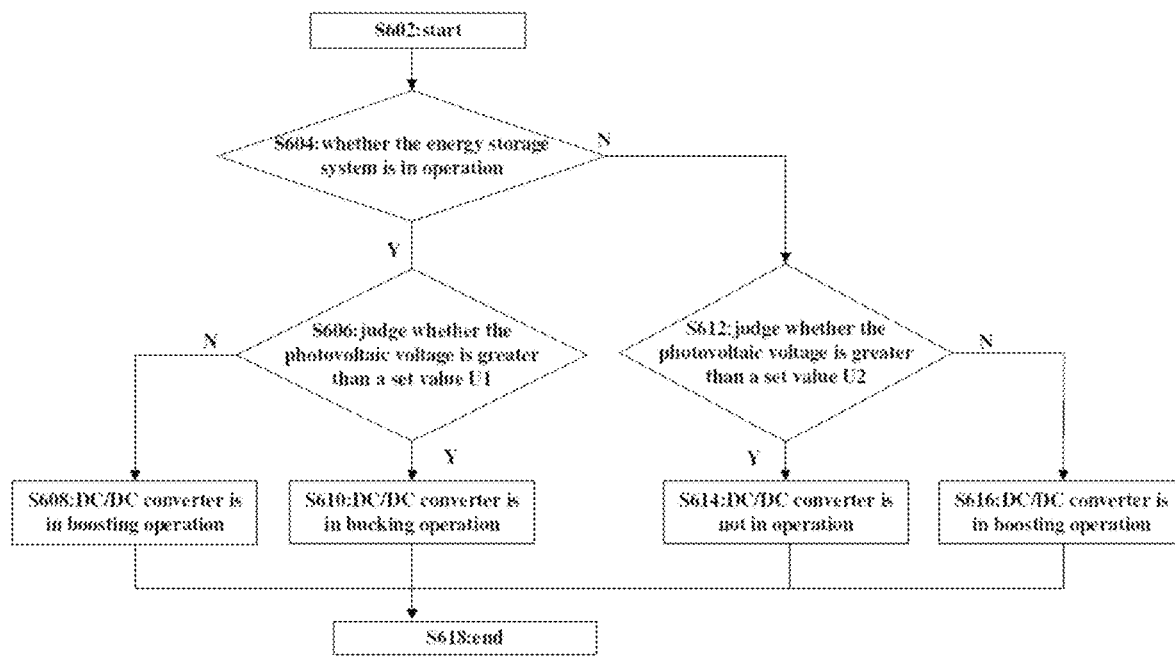
FIG. 6 is a flowchart of a control method of a photovoltaic power supply system according to other embodiments of the present disclosure.

In some embodiments of the present disclosure, another control method of a photovoltaic power supply system is also provided. Specifically, FIG. 6 is a flowchart of a control method of a photovoltaic power supply system according to other embodiments of the present disclosure. As shown in FIG. 6, the method comprises the following steps S602-S618.

In S602: start.

In S604: whether the energy storage system is in operation. If YES, proceed to step S606, and if NO, proceed to step S612.

In S606: judging whether the photovoltaic voltage is greater than a set value U1. If YES, proceed to step S610, and if NO, proceed to step S608.

In S608: DC/DC converter is in boosting operation.

In S610: DC/DC/DC converter is in bucking operation.

In S612: judging whether the photovoltaic voltage is greater than a set value U2. If YES, proceed to step S614, and if NO, proceed to step S616.

In S614: DC/DC converter is not in operation.

In S616: DC/DC converter is in boosting operation.

In S618: end.

In the above process, before photovoltaic power is output to the system, the state of the energy storage system is judged first.

(1) When the energy storage system 5 is in operation, the voltage of the DC bus 2 is required to be stable. It is judged that whether the photovoltaic output voltage exceeds a set value U1, where the set value U1 here is usually the voltage of the DC bus 2. When the photovoltaic output voltage exceeds the set value U1, the DC/DC converter 3 is in bucking operation. When the photovoltaic output voltage does not exceed the set value U1, the DC/DC converter 3 is in boosting operation. The specific schematic structural view of the system is shown in FIG. 3. In this case, the controllable switch K1/K2 is turned off, and photovoltaic power is grid connected or supplied to the compressor for use.

(2) When the energy storage system 5 is not in operation, it is judged that whether the photovoltaic output voltage exceeds a set value U2, where the set value U2 is usually the lowest DC voltage to make the DC/AC converter be in normal operation. When the photovoltaic output voltage exceeds the set value U2, the DC/DC converter 3 is not in operation, and the controllable switch K1/K2 is turned on, such that photovoltaic power is directly output to the DC bus 2 through the controllable switch K1/K2, which increases the photovoltaic power utilization rate and alleviates the heat dissipation pressure of the system. The specific schematic structural view of the system is shown in FIG. 4. When the photovoltaic output voltage is lower than the set value U2, the controllable switch K1/K2 is turned off, and the DC/DC converter 3 is in boosting operation to maintain normal operation of inverting grid connection in the system. The specific schematic structural view of the system is shown in FIG. 5. In this case, photovoltaic power is also grid connected or supplied to the compressor for use.

Based on the photovoltaic power supply system provided in the above embodiments, in some embodiments of the present disclosure, an air conditioning unit which is a photovoltaic air conditioning unit is also provided. The air conditioning unit comprises the photovoltaic power supply system described above. The compressor of the air conditioning unit is powered by the DC bus.

In the above embodiments, a photovoltaic power supply system realizing a self-adaptive operation mode is provided. The switch assembly arranged in parallel with a DC/DC converter is configured to control a grid connection mode of a photovoltaic panel. When the switch assembly is turned off, the photovoltaic panel is connected to the DC bus through the DC/DC converter; and when the switch assembly is turned on, the photovoltaic panel is directly connected to the DC bus. By way of the above manner, the problem of power loss due to the DC/DC converter continuous in boosting operation when the photovoltaic panel generates power. At the same time, the photovoltaic panel can be directly connected to the DC bus, which increases the photovoltaic power consumption efficiency so that the heat dissipation pressure of the system during the operation of photovoltaic power generation is alleviated and the heat dissipation effect of the system is improved.

Based on the control method of a photovoltaic power supply system provided in the above embodiments, in some embodiments of the present disclosure, a storage medium having computer-executable instructions is also provided. The computer-executable instructions, when executed by a computer processor, perform the control method of a photovoltaic power supply system as described above.

In the above embodiments, a photovoltaic power supply system realizing a self-adaptive operation mode is provided. The switch assembly arranged in parallel with a DC/DC converter is configured to control a grid connection mode of a photovoltaic panel. When the switch assembly is turned off, the photovoltaic panel is connected to the DC bus through the DC/DC converter; and when the switch assembly is turned on, the photovoltaic panel is directly connected to the DC bus. By way of the above manner, the problem of power loss due to the DC/DC converter continuous in boosting operation when the photovoltaic panel generates power. At the same time, the photovoltaic panel can be directly connected to the DC bus, which increases the photovoltaic power consumption efficiency so that the heat dissipation pressure of the system during the operation of photovoltaic power generation is alleviated and the heat dissipation effect of the system is improved.

Those skilled in the art will readily contemplate other implementations of the present disclosure after considering the specification and practicing the solutions disclosed here. The present disclosure is intended to cover any variation, use, or adaptive change of the present disclosure, which follow general principles of the present disclosure and comprise common knowledge or conventional technical means in the art that has not been disclosed in the present disclosure. The specification and embodiments are merely considered as exemplary, the actual scope and spirit of the present disclosure is indicated by the following claims.

It should be understood that, the present disclosure is not limited to the accurate structure that has been described above and illustrated in the accompanying drawings, and various modifications and changes may be made without departing from the scope thereof. The scope of the present disclosure is limited by the appended claims.

What is claimed is:

1. A photovoltaic power supply system, comprising:
   a photovoltaic panel;
   a DC bus;
   a DC/DC converter, wherein one end of the DC/DC converter is connected to the photovoltaic panel and the other end of the DC/DC converter is connected to the DC bus; and
   a switch assembly arranged in parallel with the DC/DC converter and configured to control a grid connection mode of the photovoltaic panel, wherein one end of the switch assembly is connected to the photovoltaic panel and the other end of the switch assembly is connected to the DC bus; and
   an energy storage system having a state in operation and a state of not in operation, located between the DC/DC converter and the DC bus, arranged in parallel with the DC bus, and configured to supply power to the DC bus or store power from the DC bus, wherein;
   the photovoltaic panel is connected to the DC bus through the DC/DC converter in response to the switch assembly is turned off, and the photovoltaic panel is directly connected to the DC bus in response to the switch assembly is turned on,
   in response to the energy storage system is in operation and an output voltage of the photovoltaic panel is greater than a first preset voltage value, the switch assembly is turned off and the DC/DC converter is in bucking operation, wherein the first preset voltage value is a voltage value of the DC bus,
   in response to the energy storage system is in operation and an output voltage of the photovoltaic panel is not greater than a first preset voltage value, the switch assembly is turned off and the DC/DC converter is in boosting operation, wherein the first preset voltage value is a voltage value of the DC bus,
   in response to the energy storage system is not in operation and an output voltage of the photovoltaic panel is greater than a second preset voltage value, the switch assembly is turned on such that the photovoltaic panel is directly connected to the DC bus, wherein the second preset voltage value is a minimum voltage value driving a DC/AC converter to operate, and
   in response to the energy storage system is not in operation and an output voltage of the photovoltaic panel is not greater than a second preset voltage value, the switch assembly is turned off and the DC/DC converter is in boosting operation, wherein the second preset voltage value is a minimum voltage value driving a DC/AC converter to operate.

2. The photovoltaic power supply system according to claim 1, further comprising:
   a DC/AC converter, wherein one end of the DC/AC converter is connected to the DC bus and the other end of the DC/AC converter is connected to an AC power grid, and the DC/AC converter is configured to supply power to the AC power grid after converting DC power of the DC bus into AC power.

3. The photovoltaic power supply system according to claim 1, wherein the DC/DC converter is configured to output an output voltage of the photovoltaic panel to the DC bus after boosting or bucking the output voltage.

4. An air conditioning unit, comprising the photovoltaic power supply system according to claim 1, wherein a compressor of the air conditioning unit is powered by the DC bus.

5. An air conditioning unit, comprising the photovoltaic power supply system according to claim 2, wherein a compressor of the air conditioning unit is powered by the DC bus.

6. An air conditioning unit, comprising the photovoltaic power supply system according to claim 3, wherein a compressor of the air conditioning unit is powered by the DC bus.

7. A control method of a photovoltaic power supply system, comprising:
   detecting an operation state of an energy storage system and an output voltage of a photovoltaic panel, wherein the energy storage system is configured to supply power to a DC bus or store power from the DC bus, the energy storage system having a state in operation and a state of not in operation;
   determining a grid connection mode of the photovoltaic panel according to the operation state of the energy storage system and the output voltage of the photovoltaic panel, comprising:
   judging whether the output voltage of the photovoltaic panel is greater than a first preset voltage value in response to the energy storage system is in operation, wherein the first preset voltage value is a voltage value of the DC bus,
   determining that the grid connection mode of the photovoltaic panel is bucking grid connection in response to the output voltage is greater than the first preset voltage value, and
   determining that the grid connection mode of the photovoltaic panel is boosting grid connection in response to the output voltage is not greater than the first preset voltage value,
   judging whether the output voltage of the photovoltaic panel is greater than a second preset voltage value in response to the energy storage system is not in operation, wherein the second preset voltage value is a minimum voltage value driving a DC/AC converter to operate,
   determining that the grid connection mode of the photovoltaic panel is direct grid connection in response to the output voltage is greater than the second preset voltage value, and
   determining that the grid connection mode of the photovoltaic panel is boosting grid connection in response to the output voltage is not greater than the second preset voltage value; and
   controlling operations of a switch assembly and a DC/DC converter according to the grid connection mode, comprising:
   controlling the switch assembly to turn off and controlling the DC/DC converter to be in bucking operation, in response to the grid connection mode of the photovoltaic panel is bucking grid connection,
   controlling the switch assembly to turn off and controlling the DC/DC converter to be in boosting operation, in response to the grid connection mode of the photovoltaic panel is boosting grid connection, and
   controlling the switch assembly to turn on such that the photovoltaic panel is directly connected to the DC bus, in response to the grid connection mode of the photovoltaic panel is direct grid connection,
   wherein the switch assembly and the DC/DC converter are arranged in parallel, one end of the DC/DC converter is connected to the photovoltaic panel, the other end of the DC/DC converter is connected to the DC bus, one end of the switch assembly is connected to the photovoltaic panel and the other end of the switch assembly is connected to the DC bus.

8. A non-transitory storage medium having computer-executable instructions, wherein the control method of a photovoltaic power supply system according to claim 7 is performed when the instructions are executed by a computer processor.

* * * * *